INVENTORS
GILBERT JAFFE
JOSEPH A. KUHN, JR.

ATTORNEYS

United States Patent Office 3,516,291
Patented June 23, 1970

3,516,291
DIRECTION AND RATE OF FLOW MEASURING INSTRUMENT
Gilbert Jaffe, District Heights, and Joseph A. Kuhn, Jr., Kensington, Md., assignors to the United States of America as represented by the Secretary of the Navy
Filed May 24, 1968, Ser. No. 732,001
Int. Cl. G01d 21/02
U.S. Cl. 73—189        9 Claims

ABSTRACT OF THE DISCLOSURE

A method and apparatus for measuring the direction and rate of flow of a moving fluid, such as ocean currents. A fluid dispenser ejects a small quantity of tracer fluid having an electrical conductivity which differs from the conductivity of the fluid being studied. The flow rate is determined from the time required for the tracer fluid to be carried from the dispenser to one of a plurality of detectors which are equidistant from the dispenser. The direction of the flow is determined from the location of the particular detector which senses an abrupt change of conductivity as the tracer passes.

---

The invention described herein may be manufactured and used by or for the Government of the United States of America for governmental purposes without the payment of any royalties thereon or therefor.

BACKGROUND OF THE INVENTION

The present invention relates generally to fluid flow meters and more particularly to a method and instrument for measuring the direction and rate of flow of a moving fluid.

When measuring the direction and rate of flow of fluids which move very slowly, such as ocean currents, conventional instruments are usually extremely inaccurate and often times are completely inoperative. Ocean currents are known to be less than 5 cm. per sec. and it has been found that an instrument is needed to study fluid movement in the range of 5 cm./sec. and less. Instruments which incorporate moving mechanical parts such as deflecting vanes or rotating impellers, which are caused to move by the force of the moving fluid upon these parts, are not effective for measuring very slow flow rates because the forces are not sufficient to overcome the mechanical friction of the instrument. Moreover, the moving parts having frequently become damaged when subjected to the various hazards encountered during submersion in water. There have also been attempts to measure ocean currents by instruments which employ non-mechanical flow sensors which utilize the Doppler effect or the phase angle shift caused by water flow along the path of a sonic transmission. However, these instruments must be corrected to compensate for changes in density of the water caused by variations in temperature, salinity and other factors which affect the change in frequency or phase angle of the sonic signal. There have also been attempts to measure the rate of flow by means of injecting a radioactive material into the water and then determining the rate of flow from the interval of time required for the radioactive source to be carried to a scintillation counter positioned at a known distance from the point of injection of the radioactive source. Not only are such devices expensive to manufacture but they also necessitate special handling of the radioactive material. Additionally, the use of such instruments contributes to the pollution and contamination of the bodies of water under investigation which should be avoided to protect marine life and other oceanographic observations.

SUMMARY OF THE INVENTION

The general purpose of the present invention is to provide a flow measuring device which embraces all of the advantages of similarly employed prior art devices and possesses none of the aforedescribed disadvantages. To attain this, the present invention utilizes a principle of operation which has been heretofore unknown to the flow measuring art. According to the method of this invention, a small quantity of tracer fluid is dispensed into the ocean and is carried by the current to one of a plurality of detectors. The dispenser and the detectors are operatively associated with a timing mechanism in such manner that the flow rate may be determined from the elapsed travel time of the tracer fluid since the distance of the detector from the dispenser is known. When using this system in the ocean, the tracer fluid may be fresh water and each detector may comprise a pair of spaced electrodes which measure the electrical conductivity of the fluid between the electrodes. It has been found that the passage of a small quantity of fresh water tracer fluid between a pair of spaced electrodes submerged in salt water produce a sharp change in electrical conductivity. The purpose of the instrument is to detect when and where a radical change in conductivity occurs but not the level of the conductivity change. When used in a fresh water environment, salt water may be employed as the tracer fluid. The operation of the device employed in this method may be program controlled whereby the tracer fluid is periodically dispensed at predetermined intervals of time and the electrical conductivity of the solution is monitored by an electronic scanning device which scans the plurality of detectors spaced circumferentially around and equidistant from the dispenser. The program controller and detectors are electrically connected to a suitable recorder which will record data representative of the flow rate and also the direction of flow.

It is therefore an object of the present invention to provide a new and improved method and apparatus for determining the direction and rate of flow of a moving fluid.

It is a further object to provide an improved instrument capable of measuring very small fluid flow rates with extreme accuracy.

A further object is to provide a precision instrument which makes accurate measurements of flow rates even in very slowly moving fluids and yet which is of simple construction and reliable in operation.

Other objects and many of the attendant advantages of this invention will be readily appreciated as the same becomes better understood by reference to the following detailed description when considered in connection with the accompanying drawing wherein:

DESCRIPTION OF THE PREFERRED EMBODIMENTS

Figure 1:
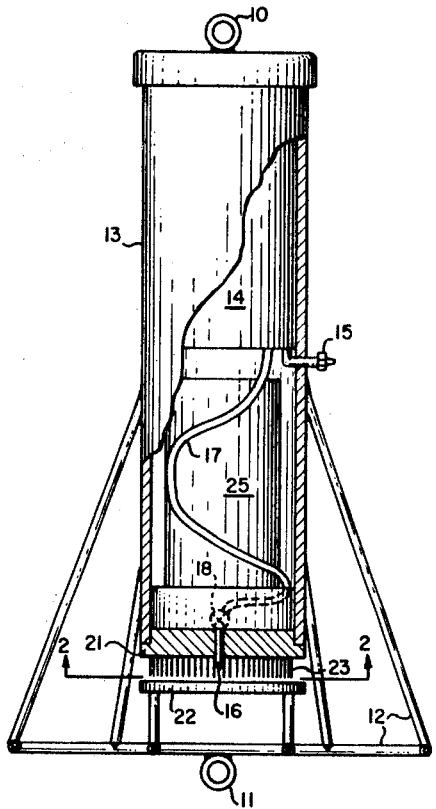
FIG. 1 is a side elevation, partially in section, of one embodiment of the present invention.

FIG. 1 of the drawing is illustrative of one embodiment of this invention which comprises an elongated underwater instrument having shackles 10 and 11 at opposed ends thereof by which the instrument may be connected to handling or mooring lines and to enable a series of instruments to be suspended from one another at various depths. A cage-like frame 12 is provided at the lower end of the instrument for protection against damage during handling. Extending substantially the entire length of the unit is a cylindrical stem or body member 13 to which the shackles and protective frame are connected. Mounted within the stem is a storage tank 14 for receiving a tracer fluid which is to be dispensed in small quantities at predetermined times. Within the storage tank is a movable membrane, not shown, such as a bellows, piston or diaphragm which separates the tank into upper and lower internal compartments.

Above the flexible membrane and within the upper compartment of the storage tank is positioned a mechanical compression spring, not shown, preferably having a constant spring rate, to resiliently bias the flexible membrane downwardly toward the outlet of the tank. The tracer fluid may be introduced under pressure to the lower compartment of the storage tank by means of an inlet conduit 15 which may be closed by a valve after the tank is filled. Filling of the tank causes the diaphragm to be displaced upwardly against the force of the spring. Extending from the storage tank to a dispensing nozzle 16 is an outlet conduit 17 having a solenoid controlled valve 18 positioned therein. The valve is normally closed but may be opened for a predetermined time in response to a controller 25, at which time the compression spring moves the diaphragm to displace and dispense a predetermined quantity of tracer fluid into the ocean at the nozzle.

Figure 2:
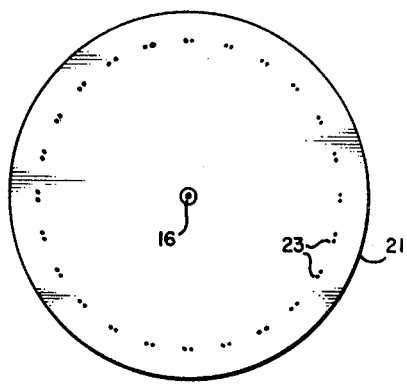
FIG. 2 is an enlarged sectional view taken on lines 2—2 of FIG. 1.

In the embodiment illustrated in FIGS. 1 and 2, the nozzle is positioned at the precise center axis of the instrument equidistant between two parallel circular plates 21 and 22 which provide the support structure for a plurality of sensing elements or detectors. The parallel plates also confine the movement of the tracer fluid to a path which intersects the detectors.

The detectors used for sensing the passage of the tracer fluid may be of any suitable design capable of detecting changes in the electrical conductivity of the fluid being tested. In a very simple embodiment, each detector could comprise a pair of electrodes 23 of any suitable size and configuration which extend downwardly from the upper plate and terminate adjacent to the lower plate. An omni-directional instrument could include eighteen pairs of electrodes positioned at 20° intervals around the periphery of the parallel plates, each electrode being spaced equidistant from the tracer fluid dispensing nozzle. Such an array would provide a directional sensitivity of ±10 degrees but it is to be understood that the number of detectors may be modified to achieve the directional accuracy desired.

Figure 3:
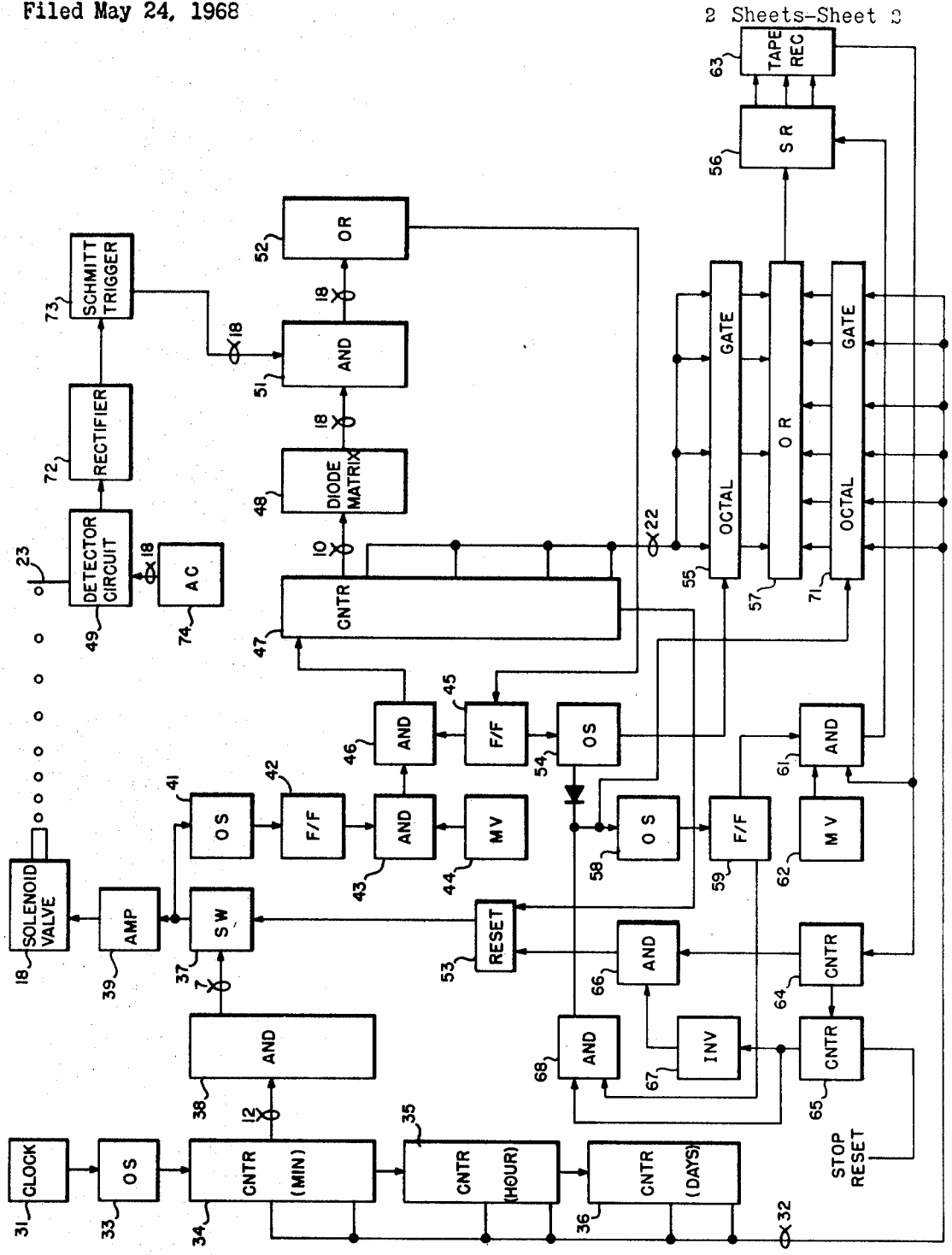
FIG. 3 is a block diagram of the electronic components of the present invention.

Referring now to FIG. 3, a block diagram is shown of the electronic components which control the operation of the instrument. A clock 31 provides one pulse each minute through a one shot delay 33 to a counter 34. The one shot inhibits short term bounce or chatter from mechanical contacts. Counters 35 and 36 are electrically connected to counter 34 and function in such manner that counters 34, 35 and 36 record minutes, hours and days respectively.

By appropriate setting of switch 37, which is connected through AND gates 38 to counter 34, sampling cycles may be initiated at predetermined time intervals such as 1, 2, 3, 4, 6 or 12 times per hour. During each sampling cycle, ten globules of tracer are dispensed, each globule being dispensed as soon as the presence of its immediately preceding globule is sensed at one or more detectors and the direction and rate of flow of that globule is recorded.

To initiate a sampling cycle, an electrical pulse appearing at switch 37 at a preselected cycle time, is amplified at 39 to drive a solenoid valve 18. The pulse is also impressed upon a delay 41 to allow valve operation. The delayed pulse from one shot 41 operates flip flop 42 enabling gate 43 to pass pulses from a multivibrator 44. These pulses are mated with the reset state of switch 45 in AND gate 46. The output of gate 46, 1.8 kHz., is applied as the input signal to counter 47. The states of the first five stages of counter 47 are applied to a diode matrix 48.

The output signals of the diode matrix will be sequentially equivalent to the binary input and will appear at eighteen output points to be mated with the outputs of eighteen conductivity detectors 49 at AND gates 51. The output of AND gate 51 is applied to OR gate 52. Sequential pulses on gates 1 through 18 of AND gates 51 will constitute one scan of the detector array. In operation each conductivity sensor will be scanned 100 times and if conductivity is not detected in 100 scans, the 1800th count in counter 47 will recycle the system through reset 53 and switch selector 37.

A positive signal of change in conductivity occurring when the tracer fluid has been carried to a detector, will permit gates 51 to pass the signal to OR gate 52. This signal will set switch 45, cutting off further signals to counter 47, thus causing a binary value less than 1800 to be retained in counter 47. The set state of switch 45 also starts a one shot 54. After signal delay in one shot 54, the pulse will open Octal gates 55 allowing transfer of the count in counter 47 to tape shift register 56 through OR gate 57. Since all eighteen detectors are electronically scanned at the rate of 100 times per second, counter 47 will register 1800 at the end of one second if no detection is made. However, when the tracer is detected, the pulses to the counter are interrupted and the counter registers the number of pulses received prior to the moment of detection. This number is indicative of rate of flow because the scan rate and distance of travel of the globule are both known. This number is also indicative of direction of flow because the particular detector experiencing the conductivity change may be determined by dividing the number registered in counter 47 by eighteen. Operation of one shot 54 also starts a one shot 58 and the pulse from one shot 58 sets flip-flop 59 opening AND gate 61 allowing signals from multivibrator 62 to step shift register 56 and record on tape recorder 63. The ready state of tape recorder 63 is fed back to AND gate 61 to prohibit multivibrator 62 from stepping shift register 56 if the tape recorder is not ready. Each shift in shift register 56 will be counted in counter 64. Six shifts will reset counter 64 and introduce one count into counter 65. Any position in counter 65 between zero and ten will enable AND gate 66 through an inverter 67 which, when coupled with the sixth count in counter 64, will cause a reset 53 and recycle of the system through switch 37 to dispense the next globule of tracer fluid.

When counter 65 receives the tenth pulse from counter 64, AND gate 66 will be closed prohibiting recycle and, upon completion of magnetic tape recording, AND gate 68 will open allowing the binary coded value of Time to be transferred from counters 34, 35 and 36 to the shift register 56 through OR gate 57 by common enable of Octal gate 71. The common enable pulse will also set flip-flop 59 through one shot 58 and start the recording process. Recording of time will step counter 64 six times and the combination of ten in counter 65 with six in counter 64 will provide a reset without a recycle pulse.

The conductivity detection system consists of a detection circuit 49 with appropriate balancing elements feeding a rectifier 72. The output of the detection circuit, with proper polarity, will be amplified by a Schmitt trigger circuit 73 when conductivity drops to a preset level. The output of the Schmitt trigger 73 becomes one leg of a two legged AND gate in AND gate 51. The detection system is powered by A.C. source 74 to reduce deterioration of the conductivity probes 23.

Since the scan count increases as the flow rate being measured decreases, the resolution of the instrument is highest at slow flow rates. It is apparent therefore that this invention is capable of measuring very slow flow rates with extreme precision.

It is to be understood that many variations of the present invention are possible. For example, the instrument could dispense the tracer fluid into the center of an open-ended tube having conductivity detectors at each end; or the tracer may be dispensed at one end of such tube with the detector positioned at the opposite end. In either case, the tube would be aligned with the direction of flow by means of a vane or the like. The instrument could also employ three tubes mounted at 60 degrees to each other, thereby permitting the measurement of flow in any direction without requiring orientation of the tubes by a vane. Also, if the directional orientation of the instrument is not fixed, the direction may be determined by conventional techniques using a compass mounted within the instrument and sensing and recording its reading.

What is claimed and desired to be secured by Letters Patent of the United States is:

1. A device for determining the direction and rate of flow of a moving fluid comprising:
   dispensing means for injecting into said moving fluid a quantity of tracer liquid to be transported away from said dispensing means by said fluid, said liquid having an electrical conductivity which differs from the electrical conductivity of said fluid,
   detector means spaced a known distance from said dispensing means for detecting the arrival of said tracer liquid by sensing an abrupt change in the electrical conductivity of the fluid, and
   timing means coupled to said dispensing means and to said detector means for measuring the travel time of the tracer liquid from the dispensing means to the detecting means,
   whereby the direction and rate of flow of said fluid is measured as a function of the tracer liquid travel time.

2. The device of claim 1 further comprising:
   recording means coupled to said timing means for recording data representative of direction and rate of fluid flow.

3. The device of claim 1 wherein:
   said dector means includes a plurality of detectors positioned in a circular array around the dispensing means and being positioned in a common plane, said detectors being equidistant from said dispensing means.

4. The device of claim 3 wherein:
   each detector includes a pair of electrodes adapted to be immersed in the fluid to monitor electrical conductivity.

5. The device of claim 4 further comprising:
   an electronic pulse generating means coupled to said detectors for sequentially scanning the detectors at a known rate,
   said timing means including an electronic pulse counter connected to said pulse generator, and
   means coupled to said detectors and to said counter for stopping said counter when a detector experiences an abrupt conductivity change.

6. The device of claim 3 further comprising:
   first and second spaced apart parallel plates, said detectors being mounted upon at least one of said plates and extending substantially the distance between said plates.

7. The device of claim 6 wherein said dispensing means includes:
   a reserovir of tracer fluid,
   a selectively actuated valve connected to said reservoir by means of a conduit,
   means for injecting a predetermined quantity of tracer liquid from said valve into said fluid upon actuation of the valve,
   said valve being positioned between said first and second plates at the central axis of said circular array of detectors.

8. A method of measuring the direction and rate of flow of moving fluids comprising:
   dispensing into a moving fluid being tested a quantity of tracer liquid to be transported by said fluid away from the point of entry into said fluid, said liquid having an electrical conductivity which differs from the electrical conductivity of the test fluid,
   monitoring the electrical conductivity of the fluid being tested at a plurality of positions each of which are a known distance from the location of the dispenser,
   detecting the arrival of said tracer liquid at one of said positions, and
   measuring the rate of flow of the fluid by measuring the time interval during which the tracer liquid travelled from the dispenrer to the detector.

9. The method of claim 8 wherein:
   the monitoring of the electrical conductivity of the test fluid at a plurality of positions is accomplished by electronically scanning a plurality of conductivity detectors at a known scan rate, and
   counting the number of scans made during the travel of said tarcer fluid to one of the detectors,
   whereby the number of scans counted is indicative of the rate of flow of the fluid and of the direction of flow.

References Cited

UNITED STATES PATENTS

| 3,319,158 | 5/1967 | McDoulett et al. | 324—9 |
| 3,435,677 | 4/1969 | Gardner | 73—189 |

JERRY W. MYRACLE, Primary Examiner